United States Patent
Romas

(10) Patent No.: US 6,550,924 B2
(45) Date of Patent: Apr. 22, 2003

(54) EXTERIOR REARVIEW MIRROR FOR VEHICLES, IN PARTICULAR, MOTOR VEHICLES

(75) Inventor: Vasile Romas, Esslingen (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 0 days.

(21) Appl. No.: 09/921,325

(22) Filed: Aug. 2, 2001

(65) Prior Publication Data

US 2002/0015242 A1 Feb. 7, 2002

(30) Foreign Application Priority Data

Aug. 3, 2000 (DE) .......................... 200 13 357

(51) Int. Cl.$^7$ .............. G02B 5/08; G02B 7/18
(52) U.S. Cl. .............. 359/841; 359/877; 248/476
(58) Field of Search ................. 359/841, 872, 359/876, 877; 248/476, 479

(56) References Cited

U.S. PATENT DOCUMENTS

| 5,604,645 | A | * | 2/1997 | Weaver ...................... 248/27.3 |
| 6,022,113 | A | * | 2/2000 | Stolpe et al. ............... 248/479 |
| 6,170,957 | B1 | * | 1/2001 | Kaspar ........................ 248/476 |
| 6,347,872 | B1 | * | 2/2002 | Brechbill et al. ........... 359/838 |

* cited by examiner

Primary Examiner—Mark A. Robinson
(74) Attorney, Agent, or Firm—Gudrun E. Huckett

(57) ABSTRACT

An exterior rearview mirror for motor vehicles has a mirror base and a mirror head mounted thereon. A drive motor is provided to move the mirror head from a position of use into a parking position. The drive motor is connected to the mirror base by being snapped into place on the mirror base in a direction of insertion; preferably a locking plug-in connection is used for this purpose. The plug-in connection has receptacles on the mirror base and counter members on the motor that are received in the receptacles, respectively.

18 Claims, 4 Drawing Sheets

EXTERIOR REARVIEW MIRROR FOR VEHICLES, IN PARTICULAR, MOTOR VEHICLES

BACKGROUND OF THE INVENTION

1. Field of the Invention

The invention relates to an exterior rearview mirror for vehicles, in particular, for motor vehicles, comprising a mirror base on which a mirror head is secured so as to be pivotable by means of a drive motor from a position of use into a parking position.

2. Description of the Related Art

In known exterior rearview mirrors of this kind the mirror head is pivoted by means of a drive motor from the position of use into the parking position. The drive motor for this purpose is fastened on the mirror base by means of screws. The attachment of the drive motor is thus labor-intensive and time-consuming.

SUMMARY OF THE INVENTION

It is an object of the present invention to configure an exterior rearview mirror of the aforementioned kind such that the drive motor can be attached in a simple and quick way on the mirror base.

In accordance with the present invention, this is achieved in that the drive motor is secured by being snapped into place on the mirror base.

As a result of the configuration according to the invention, the drive motor is secured on the mirror base by means of a snap connection. Accordingly, fastening parts such as screws or the like as securing means are no longer needed. The drive motor can thus be simply and quickly mounted on the mirror base without special labor expenditure and can be secured thereat by being snapped into place.

DESCRIPTION OF THE PREFERRED EMBODIMENTS

The exterior rearview mirror according to FIGS. 1 through 4 is comprised, as is known in the art, of a mirror base 1 (FIG. 1 and FIG. 2) and a mirror head (not illustrated) which can be pivoted by a drive motor 2 (FIGS. 3 and 4) from a position of use into a parking position. In the parking position, the mirror head is positioned alongside (parallel to) the vehicle. The mirror base 1 is connected by means of screws (not illustrated) on the motor vehicle door. The mirror base 1 is provided with screw receptacles 1a (FIG. 2) through which the screws extend.

Figure 3:
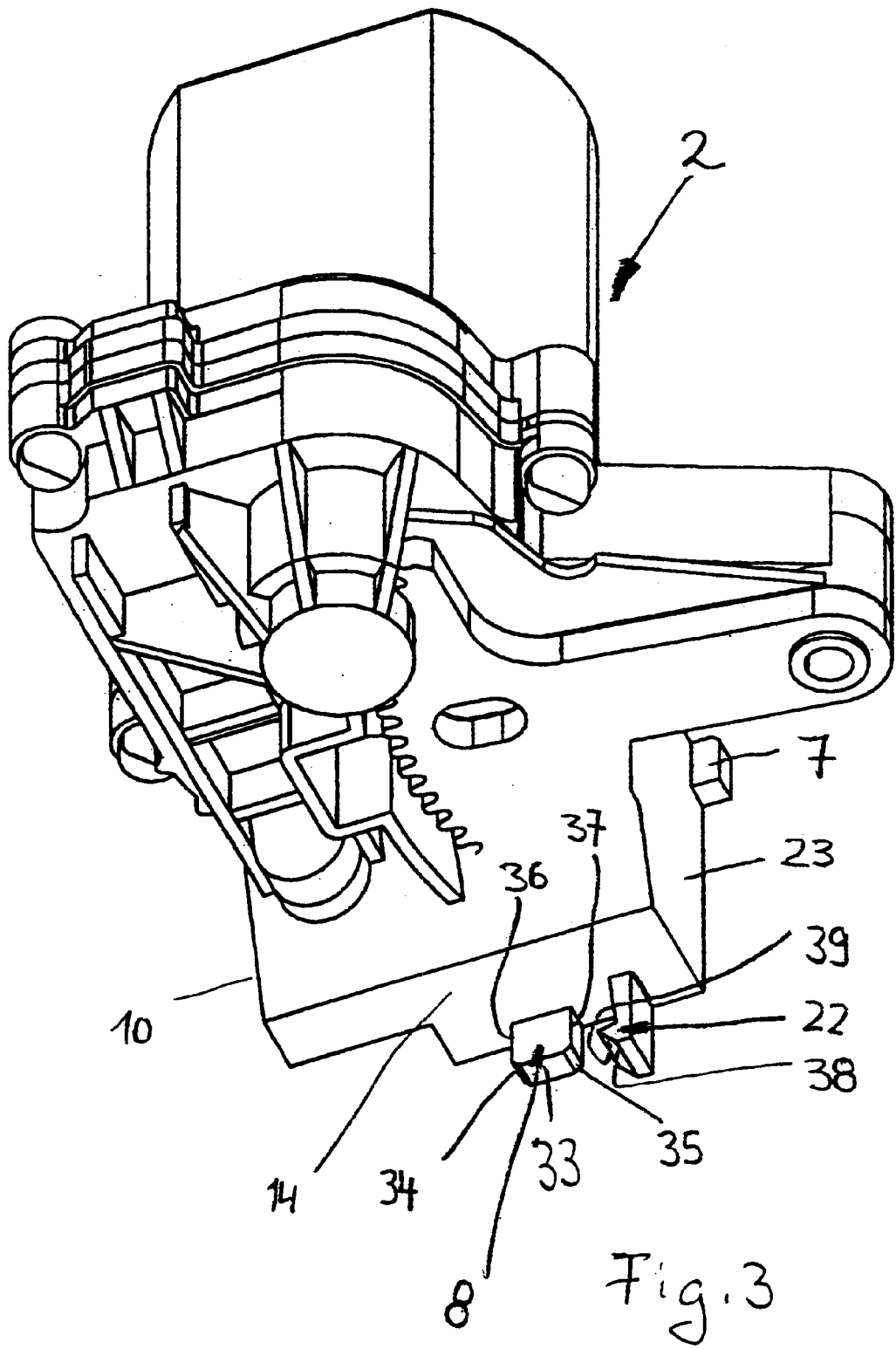
FIG. 3 is a first perspective view of a drive motor for the exterior rearview mirror according to the invention.
Figure 4:
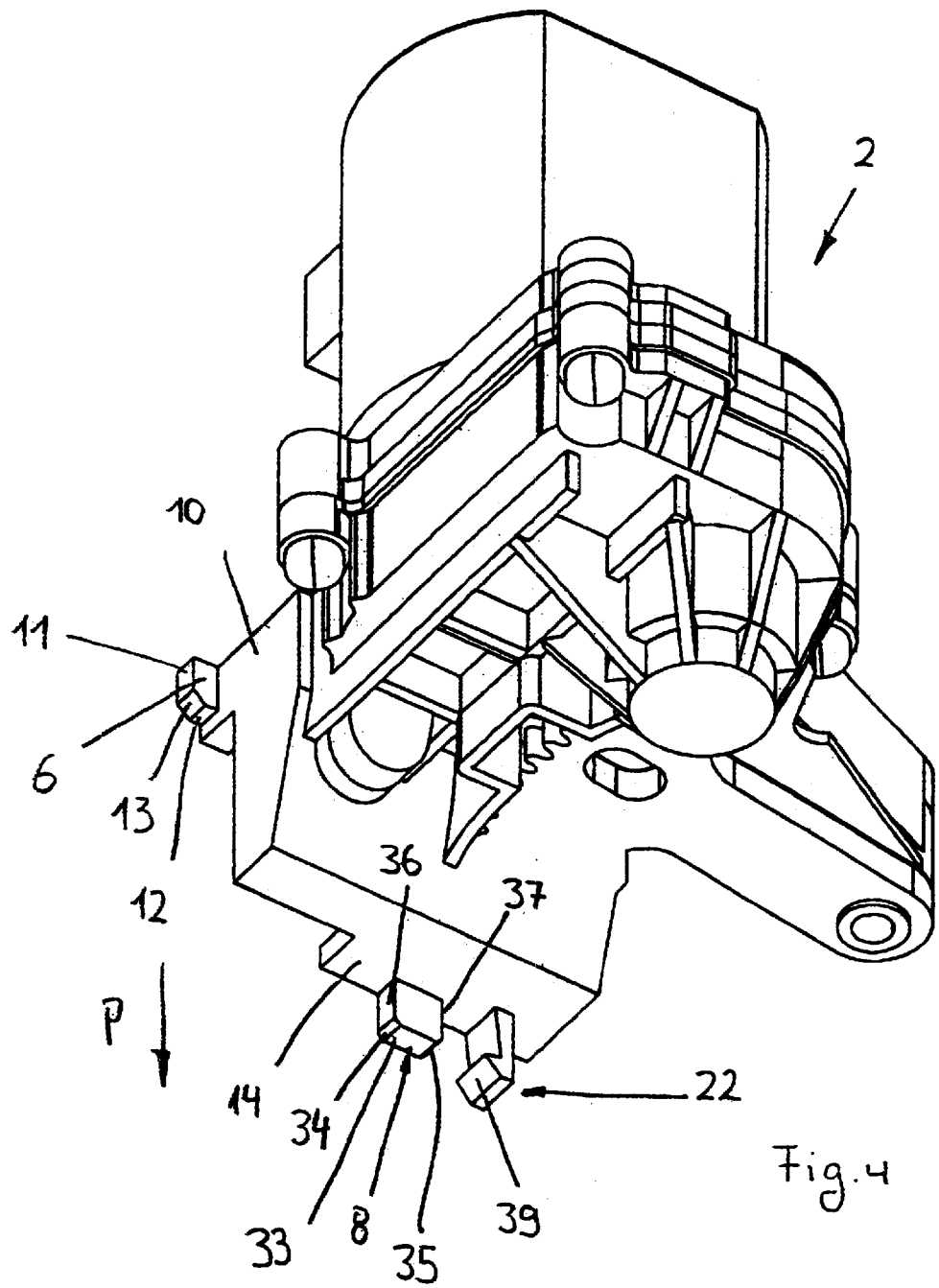
FIG. 4 is a second perspective view of the drive motor of FIG. 3 for the exterior rearview mirror according to the invention.

The drive motor 2 illustrated in FIG. 3 and FIG. 4 is secured by being snapped into place on the mirror base 1. For this purpose, the mirror base 1 in the illustrated embodiment has three receptacles 3 to 5 which are engaged by the drive motor 2 by means of corresponding counter members 6 through 8, forming a locking plug-in connection or snap connection.

The receptacle 3 of the mirror base 1 has an opening 26 at the bottom 27 of the mirror base 1 (FIGS. 1 and 2) which opening 26 extends in the longitudinal direction L of the mirror base 1. In a plan view (FIG. 1), the opening 26 has a rectangular contour with two parallel extending longitudinal edges 28, 29 which adjoin the edge 30 of a penetration 31 of the bottom 27. At the other end, the longitudinal edges 28, 29 are connected to one another by an edge 32 extending perpendicularly to the edges 28, 29.

The opening 26 is covered over a portion of its length and width by a securing member in the form of a securing nose 9 which has a spacing from the bottom 27. The nose 9 engages across the counter member 6 of the drive motor 2 in the mounted position of the motor 2. The counter member 6 is formed as a projection. The projection 6 extends perpendicularly from the sidewall 10 (FIGS. 3 and 4) of the drive motor 2 and has a plane end face 11 which has a transition in the form of a slanted portion 13 into a plane sidewall 12 of the projection 6. The sidewall 12, in turn, adjoins perpendicularly the sidewall 10 of the drive motor 2. The projection 6 extends transversely to the longitudinal direction L of the mirror base 1; in the illustrated embodiment it extends perpendicularly to the longitudinal direction L.

When mounting the drive motor 2, the drive motor 2 is positioned on the mirror base 1 such that the projection 6 is positioned in front of the securing nose 9. By moving the drive motor 2 in the longitudinal direction L of the mirror base 1, the projection 6 is moved into a position under the securing nose 9. The spacing of the nose 9 from the top side of the bottom 27 of the mirror base 1 corresponds to the thickness of the projection 6. In this way, the drive motor 2 is secured against being lifted off the mirror base 1. It is advantageous when the spacing between the bottom 27 and the of the securing nose 9 is somewhat smaller than the thickness of the projection 6. In this case, the securing nose 9, upon insertion of the projection 6, is elastically deformed so that a secure attachment of the drive motor 2 is ensured. The slanted portion 13 on the projection 6 serves as an insertion slant so that the projection 6 is reliably moved into a position underneath the securing nose 9.

The drive motor 2 is provided at the front wall 14, viewed in the direction of insertion P, with a counter member 8 which is also embodied as a projection. This projection 8 projects transversely, preferably perpendicularly, from the front wall 14 and is positioned transversely, preferably perpendicularly, to the projection 6. The projection 8 has a plane end face 33 which has a transition in the form of a slanted portion 34, 35 into the sidewall 36, 37 of the projection 8, respectively. The sidewalls 36, 37 adjoin perpendicularly the front wall 14 of the drive motor 2. The two projections 6, 8 are positioned advantageously at the same level.

The receptacle 5 facing the projection 8 is of a hood-shaped embodiment, preferably of a U-shaped cross-section, and partially covers a penetration 17 in the bottom 27 (FIG. 1) in the longitudinal direction L of the mirror base 1. The receptacle 5 can be open at the leading end in the direction of insertion P. The receptacle 5 is positioned at a smaller spacing from the longitudinal edge 15 of the mirror base 1 than the receptacle 3. Moreover, the receptacle 5 is displaced forwardly relative to the receptacle 3 in the direction of insertion P.

A locking nose 19 projects past the sidewall 18 of the receptacle 5 which sidewall is facing the edge 15. In a plan view according to FIG. 1, the locking nose 19 has a triangular contour and is configured such that its tip 20 points toward the longitudinal edge 15 and its sidewall 21 leading in the direction of insertion P extends advantageously perpendicularly to the edge 15 of the mirror base 1.

A hook tip 38 of the locking hook 22 is oriented toward the projection 8 and has an insertion slant 39 which is positioned at an incline to the insertion direction P. This insertion slant 39 impacts on a corresponding slanted surface 40 of the locking nose 19 when the drive motor 2 is inserted into the receptacles 3–5. When this occurs, the locking hook 22 is elastically displaced to such an extent that the locking hook 22 engages behind the locking nose 19 of the receptacle 5. The drive motor 2 in this way is properly secured against being pushed back in a direction counter to the direction of insertion P.

Figure 1:
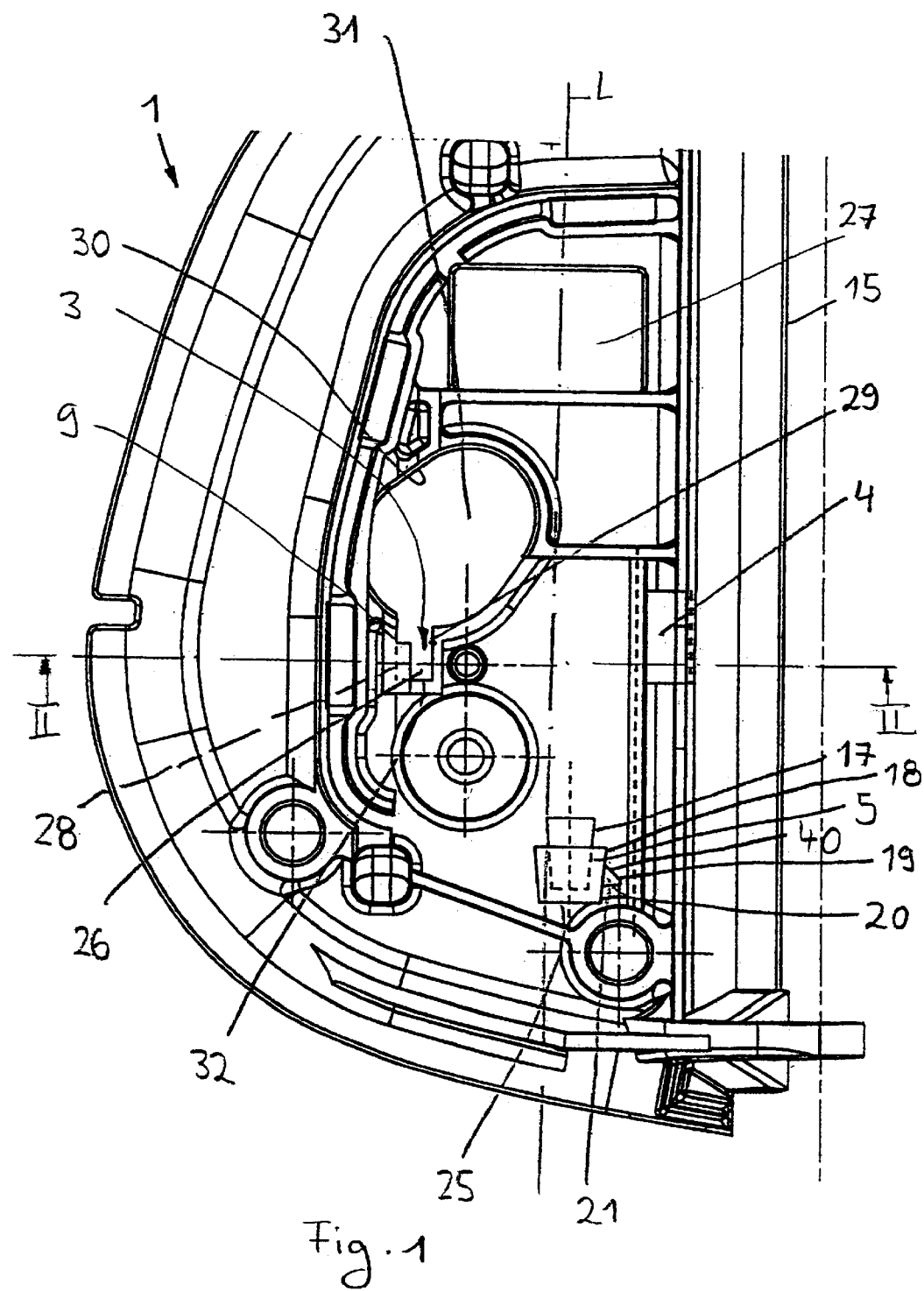
FIG. 1 shows a part of the mirror base of an exterior rearview mirror according to the present invention in a plan view viewed in the direction of arrow I in FIG. 2.
Figure 2:
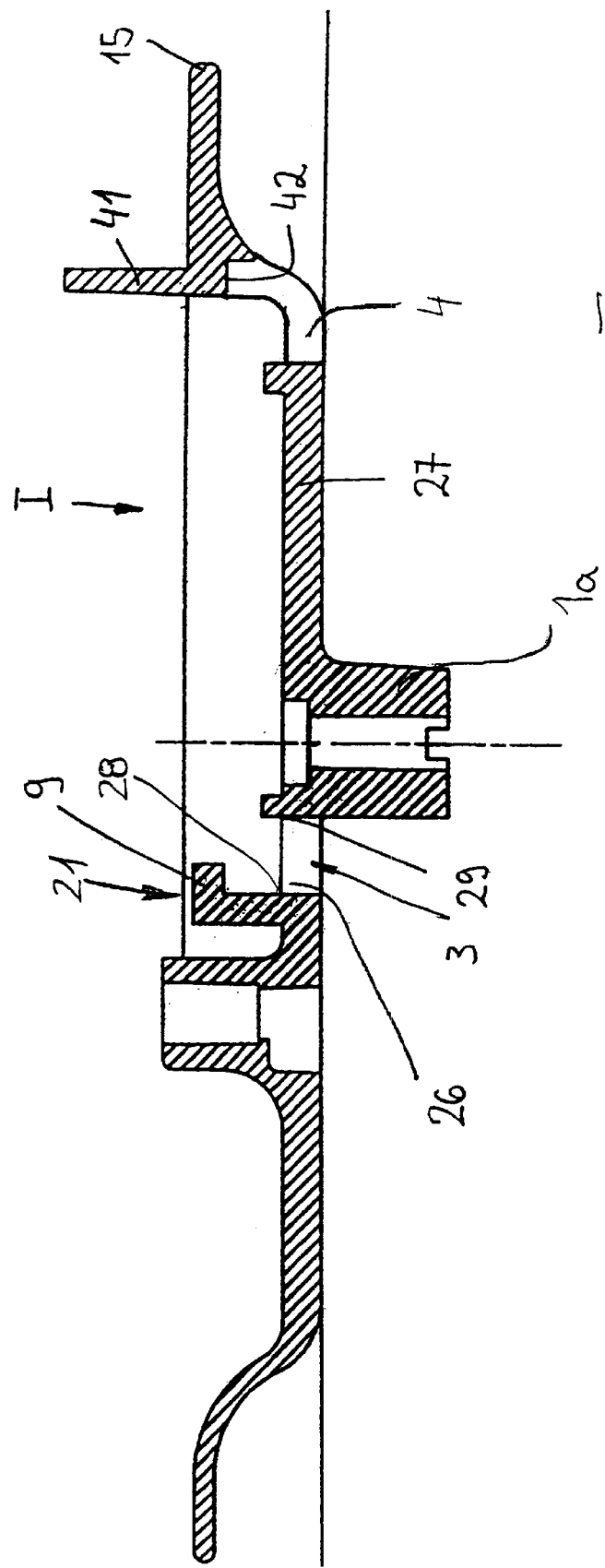
FIG. 2 shows the mirror base according to FIG. 1 in section along the line II—II of FIG. 1.

The receptacle 4 is positioned opposite the receptacle 3, relative to the longitudinal axis L of the mirror base 1, and is formed by a penetration within the mirror base 1. The receptacle 4, in the plan view according to FIG. 1, has a rectangular contour and extends in the longitudinal direction L of the mirror base 1. As illustrated in FIG. 2, the receptacle in the form of a penetration 4 extends into an upwardly extending edge area 41 (FIG. 2). This configuration provides a locking surface 42 which extends parallel to the top side of the mirror base 1 and covers the counter member 7, which is in the form of a projection, in the mounted position. The counter member 7 is connected transversely, preferably perpendicularly, to the sidewall 23 of the drive motor 2 and is positioned in the same plane as the two other projections 6 and 8.

The locking nose 19 has correlated therewith a locking hook 22 (FIGS. 3 and 4) provided on the drive motor 2. The locking hook 22 projects perpendicularly from the front wall 14 of the drive motor 2 and is positioned at a minimal spacing adjacent to the projection 8.

For mounting the drive motor 2, the drive motor 2 is positioned such on the mirror base 1 that the projections 6 through 8 are positioned in front of the receptacles 3 to 5, respectively. The drive motor 2 is moved transversely to the direction of insertion P to such an extent that the projection 7 engages the receptacle 4. In this way, the drive motor 2 is guided during the subsequent movement of the drive motor 2 in the direction of insertion P such that the projections 6, 8 will reach reliably the receptacles 3 and 5 and the locking hook 2 will engage behind the locking nose 19. In this way, the drive motor 2 is securely held on the mirror base 1. It is secured against accidental detachment in the direction of insertion P and locked against being lifted off the mirror base 1 at three locations (3, 4, 5), which are spaced from one another and are positioned on the corners of an imaginary triangle on the mirror base 1,. Accordingly, the drive motor 2 is provided with an extremely secure attachment on the mirror base 1. Mounting of the drive motor 2 can be performed very easily and within a very short period of time without requiring any additional securing parts.

While specific embodiments of the invention have been shown and described in detail to illustrate the inventive principles, it will be understood that the invention may be embodied otherwise without departing from such principles.

What is claimed is:

1. An exterior rearview mirror for motor vehicles, the exterior rearview mirror comprising:
    a mirror base (1) and a mirror head mounted thereon;
    a drive motor (2) configured to move the mirror head from a position of use into a parking position;
    wherein the drive motor (2) is snapped Into place on the mirror base (1) In a direction of insertion (P) and connected to the mirror base (1);
    wherein the mirror base (1) has one or more receptacles (3, 4, 5) and the motor (2) has one or more counter members (6, 7, 8) configured to be received in the receptacles (3, 4, 5), respectively; and
    wherein a first one of the receptacles (3) has a securing member (9) configured to engage across a first one of the counter members (6).

2. The rearview mirror according to claim 1, wherein the drive motor (2) is connected to the mirror base (1) by a locking plug-in connection.

3. The rearview mirror according to claim 1, wherein the mirror base (1) has three of the receptacles (3, 4, 5) and wherein the motor (2) has three of the counter members (6, 7, 8).

4. The rearview mirror according to claim 1, wherein the securing member (9) is a securing nose 9.

5. The rearview mirror according to claim 1, wherein a second one of the counter members (7) is a projection configured to penetrate into a second one of the receptacles (4).

6. The rearview mirror according to claim 5, wherein a third one of the receptacles (5) is hood-shaped.

7. The rearview mirror according to claim 6, wherein the hood-shaped third receptacle (5) has a U-shaped cross-section.

8. The rearview mirror according to claim 6, wherein a third one of the counter members (8) is a projection configured to penetrate into the hood-shaped third receptacle (5).

9. The rearview mirror according to claim 6, wherein the motor (2) has at least one locking hook (22) and the mirror base (1) has a locking nose (19), wherein the at least one locking hook (22) is configured to engage the locking nose (19).

10. The rearview mirror according to claim 9, wherein the locking nose (19) is provided on the third receptacle (5).

11. The rearview mirror according to claim 1, wherein the mirror base (1) has a first, a second and a third one of the receptacles (3, 4, 5) and wherein the motor (2) has a first, a second, and a third one of the counter members (6, 7, 8), wherein the first, second, and third receptacles (3, 4, 5) are arranged so as to define the corners of a triangle.

12. The rearview mirror according to claim 11, wherein the first and third receptacles (3, 5) are open in a direction counter to the direction of insertion (P) of the motor (2).

13. The rearview mirror according to claim 12, wherein the second counter member (7) is a projection and wherein the second receptacle (4) is configured to engage across the second counter member (7).

14. The rearview mirror according to claim 11, wherein the first receptacle (3) and the second receptacle (4) are arranged at the same level of the mirror base (1).

15. The rearview mirror for motor vehicles, the exterior rearview mirror comprising:
    a mirror base (1) and a mirror head mounted thereon;
    a drive motor (2) configured to move the mirror head from a position of use into a parking position;
    wherein the drive motor (2) is snapped into place on the mirror base (1) in a direction of insertion (P) and connected to the mirror base (1);
    wherein the mirror base (1) has one or more receptacles (3, 4, 5) and the motor (2) has one or more counter members (6, 7, 8) configured to be received In the receptacles (3, 4, 5), respectively;

wherein the mirror base (1) has a first, a second and a third one of the receptacles (3, 4, 5) and wherein the motor (2) has a first, a second, and a third one of the counter members (6, 7, 8), wherein the first, second, and third receptacles (3, 4, 5) are arranged so as to define the corners of a triangle;

wherein the third receptacle (5) is arranged in front of the first and second receptacles (3, 4) in the direction of insertion (P).

16. The rearview mirror according to claim 15, wherein the first and third receptacles (3, 5) are open in a direction counter to the direction of insertion (P) of the motor (2).

17. The rearview mirror according to claim 16, wherein the second counter member (7) Is a projection and wherein the second receptacle (4) is configured to engage across the second counter member (7).

18. The rearview mirror according to claim 15, wherein the first receptacle (3) and the second receptacle (4) are arranged at the same level of the mirror base (1).

* * * * *